(12) United States Patent
Kim

(10) Patent No.: US 6,689,441 B1
(45) Date of Patent: Feb. 10, 2004

(54) LAMINATE SHEET HAVING A THIN FILM OF PRESSURE SENSITIVE ADHESIVE

(75) Inventor: Yang-Pioung Kim, Seoul (KR)

(73) Assignee: GMP Co., Ltd., Kyonggi (KR)

( * ) Notice: Subject to any disclaimer, the term of this patent is extended or adjusted under 35 U.S.C. 154(b) by 0 days.

(21) Appl. No.: 10/292,367

(22) Filed: Nov. 13, 2002

(30) Foreign Application Priority Data

Sep. 12, 2002 (KR) .................. 10-2002-0055222

(51) Int. Cl.[7] ................................. B32B 7/12
(52) U.S. Cl. .................. 428/40.1; 428/41.3; 428/41.5; 428/41.8; 428/42.1; 428/42.2; 428/42.3; 428/354
(58) Field of Search ................ 428/40.1, 42.1, 428/42.2, 42.3, 354, 41.3, 41.5, 41.8, 156

(56) References Cited

U.S. PATENT DOCUMENTS 5,888,650 A * 3/1999 Calhoun ................. 428/354
6,197,397 B1 * 3/2001 Sher ........................ 428/42.3

* cited by examiner

*Primary Examiner*—Nasser Ahmad
(74) *Attorney, Agent, or Firm*—Harrison & Egbert

(57) ABSTRACT

A laminate sheet having a pressure sensitive adhesive layer, characterized in that the adhesive layer is superimposed on an embossed release layer, whereby embossed shapes of the release layer are transferred onto the adhesive layer. Upon conducting a lamination process the embossed adhesive layer is separated from the release layer and thus functions to prevent the formation of air pockets between the adhesive layer and a subject sheet and the detachment of the laminated adhesive layer from the subject sheet.

4 Claims, 1 Drawing Sheet

[fig 1]
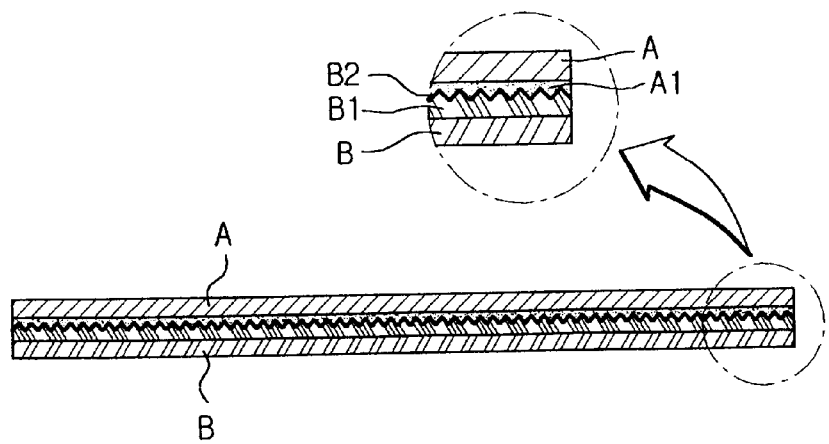
[fig 2a]
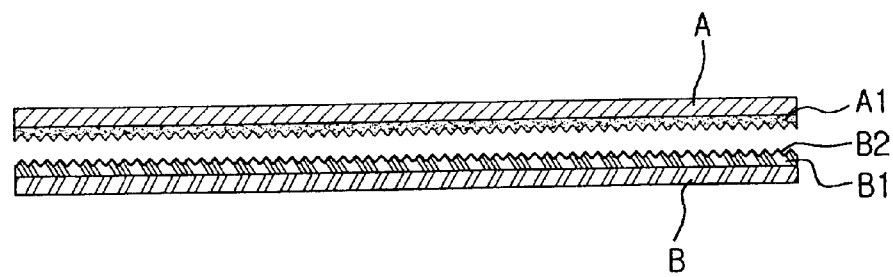
[fig 2b]
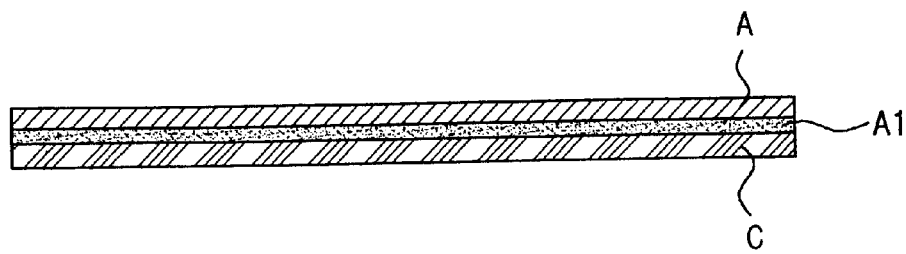

LAMINATE SHEET HAVING A THIN FILM OF PRESSURE SENSITIVE ADHESIVE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention pertains to a laminate sheet comprising an adhesive layer with an embossed surface, by laying the adhesive layer on a release layer formed on a thermoplastic film having a roughened surface by embossing treatment. More specifically, the present invention concerns a laminate sheet having a thin film of a pressure sensitive adhesive, characterized in that a surface of an embossed thermoplastic polyethylene film is subjected to a release treatment to form the release layer, on which the adhesive layer is superimposed, whereby the embossed shapes are transferred from the release layer to the adhesive layer, thus preventing the formation of air pockets between the laminated adhesive layer and the subject sheet and the detachment of the adhesive layer from the subject during a laminating process.

BACKGROUND OF THE INVENTION

With the intention of preventing the formation of air pockets between a laminate film and a subject sheet and the detachment of the laminated layer from the subject sheet, use has been typically made of thermoplastic films embossed with various shapes, for instance, laminate PE films comprising grooves continuously formed in a longitudinal direction or in both of a longitudinal direction and a transverse direction thereof.

However, such laminate films should be subjected to hot laminating process when the film is laminated on the subject. In addition, the above films are disadvantageous in terms of poor printability and adhesiveness.

BRIEF SUMMARY OF THE INVENTION

Therefore, it is an object of the present invention is to alleviate the problems encountered in the prior art and to provide a laminate sheet having a pressure sensitive adhesive layer laminated thereon. The laminate sheet is drastically increased in adhesiveness while a function of preventing the formation of air bubbles is maintained at the same level as in conventional laminate films. The sheet can be subjected to a cold laminating process, by transferring embossed shapes on a polyethylene film onto the adhesive layer to roughen the adhesive layer face.

BRIEF DESCRIPTION OF THE SEVERAL VIEWS OF THE DRAWINGS

FIG. 1 is a sectional side view of a laminate sheet according to the present invention.

FIG. 2a is a sectional view showing the laminate sheet having a pressure sensitive adhesive layer separated from a release layer according to the present invention.

FIG. 2b is a sectional view showing the laminate sheet laminated on a certain subject sheet according to the present invention.

DETAILED DESCRIPTION OF THE INVENTION

Based on the present invention, a laminate sheet having an embossed adhesive layer can function to prevent formation of air pockets between a subject to be laminated and the adhesive layer and detachment of the laminated adhesive layer from the subject, and can be subjected to a cold laminating process. Such a laminate sheet of the present invention is characterized in that the adhesive layer having a base layer is superimposed on a release layer, in which the release layer is obtained by performing a release treatment on an embossed polyethylene film or other films laminated on a supporting layer, whereby the embossed shapes on the release layer are transferred onto the adhesive layer, and, upon conducting a lamination process, the embossed adhesive layer prevents the detachment of this layer from the subject sheet and formation of air pockets therebetween after the adhesive layer having the transferred embossed shapes thereon is separated from the release layer.

As shown in FIG. 1, on a supporting layer 'B' is laminated an embossed thermoplastic film 'B1', on which a release treatment is carried out to form a release layer 'B2'. An adhesive layer 'A1' having a base layer 'A' is superimposed on such a release layer 'B2', thus forming a laminate sheet of the present invention.

The supporting layer 'B' may be made of paper or polyester, and may be laminated with other synthetic resin film. The base layer 'A' is selected from among PVC film, polyester film, polypropylene film and PE film. The release layer is a silicon release layer. As the adhesive layer, an adhesive such as acryl, rubber and hot melt, etc., is used. The embossed thermoplastic film 'B1' is preferably made of polyethylene. In some cases, other thermoplastic films which may be subjected to embossing treatment are used as such a film 'B1'.

As for the laminate sheet of the present invention, during a lamination process, the adhesive layer 'A1' is separated from the release layer 'B2' as shown in FIG. 2a, and the separated adhesive layer 'A1' having the base layer 'A' is laminated on a certain subject 'C' as seen in FIG. 2b.

When the adhesive layer 'A1' is bonded on the subject sheet, the embossed shapes on the adhesive layer 'A1' function to prevent the formation of air pockets between the bonded layer and the subject sheet and the detachment of the bonded layer from the subject sheet. The base layer functions as a protective layer of the subject sheet. The release layer 'B2', the embossed plastic film layer 'B1' and the supporting layer 'B' laminated together are eliminated.

The laminate sheet having the pressure sensitive adhesive layer of the present invention can be subjected to cold lamination process only by use of a roller.

A better understanding of the present invention may be obtained in light of the following example which is set forth to illustrate, but is not to be construed to limit the present invention.

EXAMPLE 1

A thin film of molten polypropylene which was extruded through a T-die was laminated on one side a paper layer, after which a molten polyethylene solution that was extruded through a T-die was coated on the other side of the paper layer. Then, various shapes of embossments (use of a film comprising grooves formed in a longitudinal direction and a transverse direction) were formed on such a polyethylene layer, and a silicon treatment was carried out on the embossed surface to form a release layer. An acryl adhesive having a base layer was laminated on the release layer, thereby preparing a laminate sheet. Specifications of such a sheet are given in Table 1, below.

TABLE 1

| Type of Laminated Layer | Specification |
|---|---|
| PVC Film Layer | 75 μ thickness |
| Adhesive Layer | 23 μ thickness |
| Release Layer | Several microns |
| PE Film Layer | 20–30 μ |
| Paper Layer | 100 g/m$^3$ |
| PP Thin Film Layer | 20–50 μ |

In the laminate sheet laminated in the above layer-order, which is not limited thereto, the PVC layer as a base layer (protective layer of a subject) may be replaced with PET film, PE film or PP film, and the embossed PE film layer may be replaced with other thermoplastic resin films which may be subjected to embossing treatment. Also, instead of the paper layer and the PP layer as a supporting layer, other film layers may be used.

As described above, in the laminate sheet of the present invention, the embossed shapes are transferred from the release layer (carrier layer) to the adhesive layer that is bonded to the subject sheet. Thus, during a laminating process, the adhesive layer having such embossed shapes thereon acts to prevent the formation of air pockets between this layer and the subject sheet and the detachment of the bonded adhesive layer from the subject, and is superior in adhesion function to conventional polyethylene films or polypropylene films. Accordingly, the inventive laminate sheet can be obtained by performing a cold laminating process under a pressure of a roller.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

I claim:

1. A laminate sheet comprising:

a supporting layer;

a thermoplastic film having an embossed surface thereon;

a silicon release layer applied over said embossed surface of said thermoplastic film;

an adhesive layer applied onto said release layer such that said embossed surface of said thermoplastic film is reflectively formed in said adhesive layer; and a base layer secured to said adhesive layer on a side opposite said release layer, said thermoplastic film and said release layer and said adhesive layer and said base layer being laminated in order onto said supporting layer.

2. The laminate sheet of claim 1, said base layer being selected from the group consisting of polyvinyl chloride film, polyester film and polypropylene film.

3. The laminate sheet of claim 1, said thermoplastic film selected from the group consisting of polyethylene film, polypropylene film and polyvinyl chloride film.

4. The laminate sheet of claim 1, said adhesive layer being an adhesive selected from the group consisting of acryl, rubber and hot melt adhesive.

\* \* \* \* \*